(12) United States Patent
Childers et al.

(10) Patent No.: US 7,664,347 B2
(45) Date of Patent: Feb. 16, 2010

(54) MULTI-CORE OPTICAL FIBER SENSOR

(75) Inventors: Brooks Childers, Christiansburg, VA (US); John Guarniere, Annapolis, MD (US); Daniel Homa, Bloomsbury, NJ (US)

(73) Assignee: Baker Hughes Incorporated, Houston, TX (US)

( * ) Notice: Subject to any disclaimer, the term of this patent is extended or adjusted under 35 U.S.C. 154(b) by 146 days.

(21) Appl. No.: 11/448,475

(22) Filed: Jun. 7, 2006

(65) Prior Publication Data

US 2007/0297711 A1    Dec. 27, 2007

(51) Int. Cl.
*G02B 6/00* (2006.01)
(52) U.S. Cl. .......................... 385/12; 385/13
(58) Field of Classification Search ............ 385/12, 385/13
See application file for complete search history.

(56) References Cited

U.S. PATENT DOCUMENTS

| | | | |
|---|---|---|---|
| 4,443,698 A | 4/1984 | Schiffner | |
| 5,563,967 A | 10/1996 | Haake | |
| 6,160,944 A | 12/2000 | Payne et al. | |
| 6,285,446 B1 | 9/2001 | Farhadiroushan | |
| 6,301,420 B1 | 10/2001 | Greenaway et al. | |
| 6,389,187 B1 | 5/2002 | Greenaway et al. | |
| 6,807,324 B2 | 10/2004 | Pruett | |
| 2004/0083808 A1 | 5/2004 | Rambow et al. | |
| 2006/0013523 A1 | 1/2006 | Childlers et al. | |
| 2006/0115204 A1 | 6/2006 | Marsh et al. | |
| 2007/0110355 A1 | 5/2007 | Jaaskelainen et al. | |
| 2007/0297712 A1* | 12/2007 | Meneghini et al. | ............ 385/13 |

FOREIGN PATENT DOCUMENTS

WO    0037914 A    6/2000

OTHER PUBLICATIONS

U.S. Appl. No. 11/451,207, filed on Jun. 12, 2006.
International Search Report for PCT?US2007*069207 Mailed on Jul. 11, 2007.

* cited by examiner

*Primary Examiner*—Kevin S Wood
(74) *Attorney, Agent, or Firm*—Cantor Colburn LLP

(57) ABSTRACT

A multi-core optical fiber sensor is described, which sensor includes an optical fiber having at least two cores, wherein the cores have collocated measurement portions, for example in-fiber interferometers or Bragg grating portions. In an exemplary embodiment, the fiber is provided with collocated measurement portions during fiberization to eliminate drift factors and to provide temperature corrected parameter measurement capabilities.

10 Claims, 6 Drawing Sheets

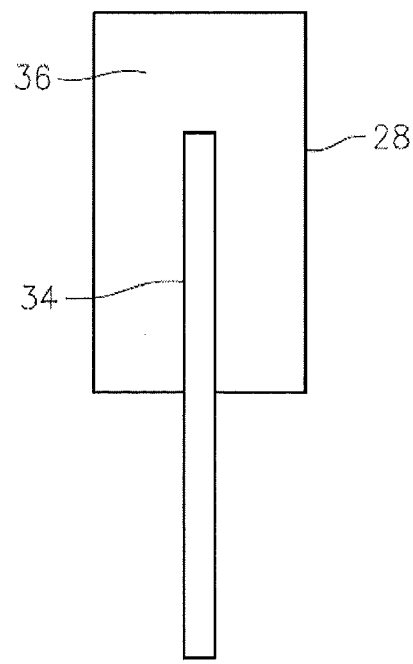
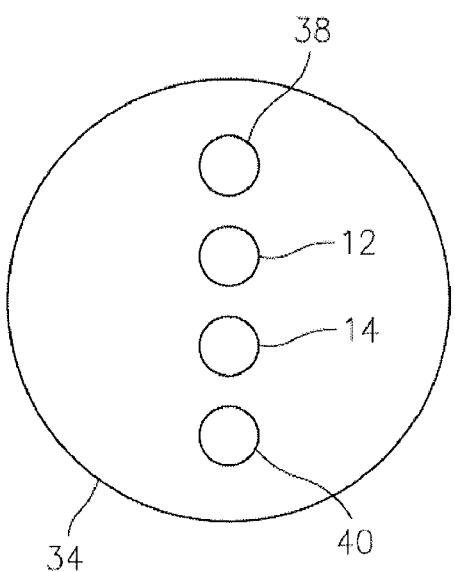
FIG. 5  FIG. 6
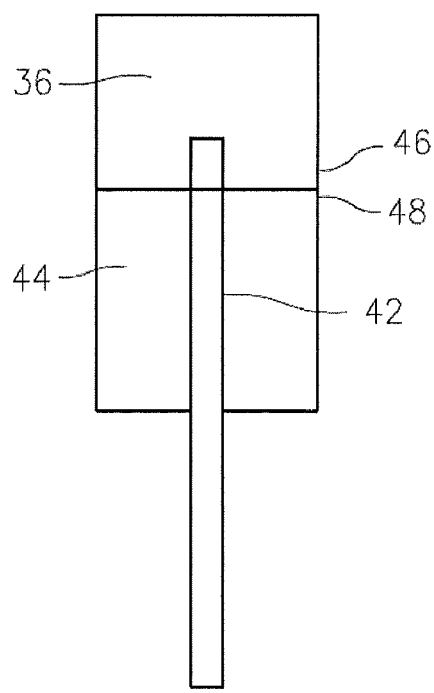
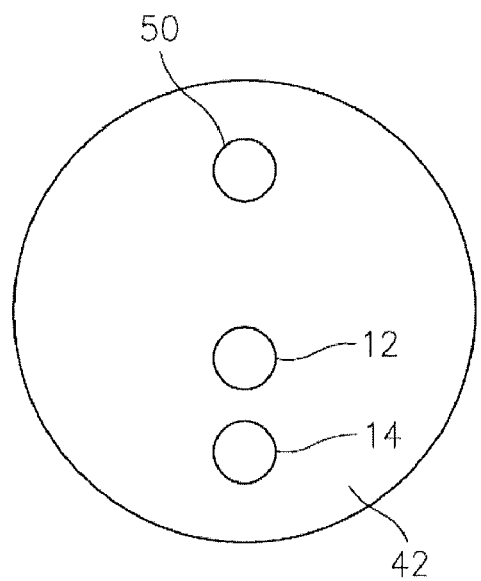
FIG. 7  FIG. 8

MULTI-CORE OPTICAL FIBER SENSOR

BACKGROUND

Optical fiber sensors, particularly those utilized in harsh environments, such as in downhole environments, are predominantly plagued by undesired parameter changes (e.g., temperature changes for a pressure sensor) and drift sources. Thus, where measurement is attempted, additional sensors have been required to attempt to compensate for such undesired parameter changes and drift of the measurement. For example, two pressure sensors might be employed near each other having different sensor characteristics (i.e., different responses to the undesired parameter), and calculations may be made in an attempt to eliminate the effect of the parameter on the measurement (effectively in an attempt to isolate the parameter of interest, e.g., temperature effects at the point of interest).

While this may appear to be a good solution, conditions at the two sensors must be exact to accurately eliminate the influences of the undesired parameter. Also, the need to set up and run multiple sensors at every measurement point of interest can be tedious and costly.

What is needed in the art is a simple, low cost solution to elimination of undesired parameter changes and drift sources in optical fiber sensors.

SUMMARY

The above-described an other problems and deficiencies of the prior art are overcome and alleviated by the presently described multi-core optical fiber sensor, which includes an optical fiber having at least two cores, wherein the cores have collocated measurement portions, for example, in-fiber interferometers, Bragg grating portions or random photo-etched structures. In an exemplary embodiment, the measurement portions are written into the multiple cores during fiberization. In another exemplary embodiment, the measurement portions are written into the cores during the drawing process and prior to application of the protective coating.

In an exemplary embodiment, the fiber is arranged such that a force will act on the multi-core fiber affecting the collocated measurement portions in a different manner. Such force may be an applied force in response to an environmental change (e.g., a diaphragm actuating against the fiber in response to a pressure change), or such force may be directly responsive to the environmental change (e.g., the shape change of the fiber resultant from the shape change of a downhole drill string or casing). In another exemplary embodiment, such arrangement causes one grating to be in compression and another to be in tension.

In other exemplary embodiments, different portions of the multi-core fiber are engineered to react differently to pressure, and light guiding cores in the collocated measurement portions are configured to sense pressure. In an exemplary embodiment, the fiber contains a lower modulus core near a first light guiding core and a higher modulus core near a second light guiding core. The provision of the multi-core fiber and the differential reaction of the pressure to the fiber portions containing the lower and higher modulus cores, respectively, at the measurement portions of the multiple cores, eliminate temperature changes or drift sources that might otherwise affect the measurements.

In other exemplary embodiments, a reference pressure acts on a multi-core fiber in addition to a well bore (or other application) pressure. In such embodiment, the multi-core fiber contains at least two light guiding cores provided in different spatial relationship relative to a hollow core. The hollow core acts as a port causing different pressure induced reactions with regard to the light guiding cores.

In another exemplary embodiment, a multi-core fiber is arranged on a surface or in a device of interest such that change in shape of the surface or device will act on the multi-core fiber affecting the collocated measurement portions in a different manner. In another exemplary embodiment, optical domain reflectometry is utilized with the multi-core fiber to provide distributed measurements and shape sensing at various points of interest.

The above-discussed and other features and advantages of the presently described multi-core optical fiber sensor will be appreciated and understood by those skilled in the art from the following detailed description and drawings.

BRIEF DESCRIPTION OF THE DRAWINGS

Referring now to the drawings, wherein like elements are numbered alike in the several FIGURES:

FIG. 5 is a cross-sectional plan view of an exemplary multi-core fiber actuated by well pressure;

FIG. 6 is a cross-sectional view of an exemplary multi-core fiber having different modulus cores and light guiding cores;

FIG. 7 is a cross-sectional plan view of an exemplary multi-core fiber actuated by well and reference pressures;

FIG. 8 is a cross-sectional view of an exemplary multi-core fiber having a hollow, port core and light guiding cores;

DETAILED DESCRIPTION OF EXEMPLARY EMBODIMENTS

Reference will now be made in detail to exemplary embodiments, examples of which are illustrated in the accompanying drawings.

Figure 1:
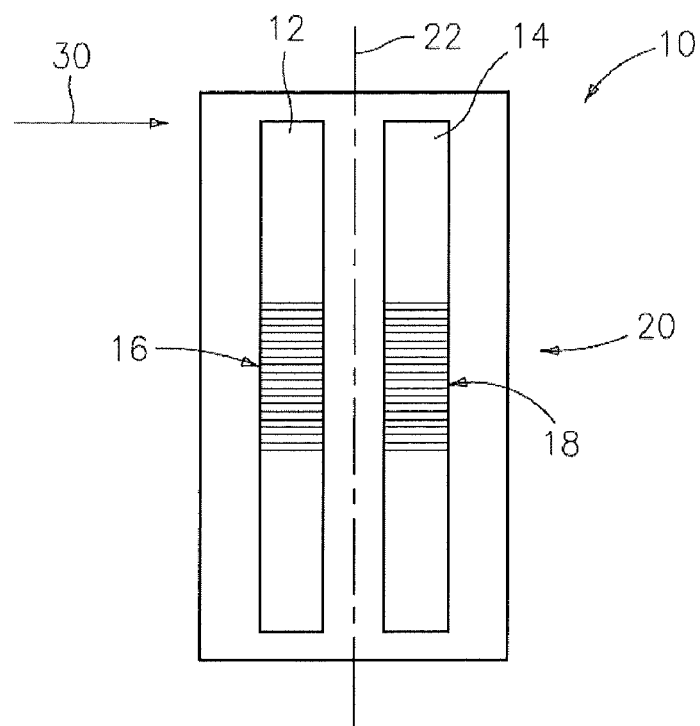
FIG. 1 is a cross-sectional plan view of an exemplary multi-core fiber utilizing Bragg Gratings at a same distance along the fiber.

Referring now to FIG. 1, a cross-sectional plan view of an exemplary multi-core fiber is illustrated generally at 10. A first core 12 and a second core 14 include Bragg grating portions 16, 18 at a same measurement portion, shown generally at 20, relative to a longitudinal axis, illustrated by line 22, of the fiber 10.

The grating portions 16 and 18 may be written in the cores by any fashion and at any time. However, in an exemplary embodiment, the grating portions 16 and 18 are photoetched in cores 12 and 14 during fiberization. In a particular exemplary embodiment, the grating portions are written during the drawing process and prior to the application of a protective coating. In such exemplary embodiment, the collocated sensors are particularly insensitive to drift factors since all collocated grating portions will drift together.

Also, while the above exemplary embodiment describes use of Bragg gratings, it should be recognized that other structures useful for reading out such fibers might be used, such as in-fiber interferometers, Rayleigh scatter and random photoetched structures, among others, as long as collocated measurement portions are provided in the fiber.

Figure 2:
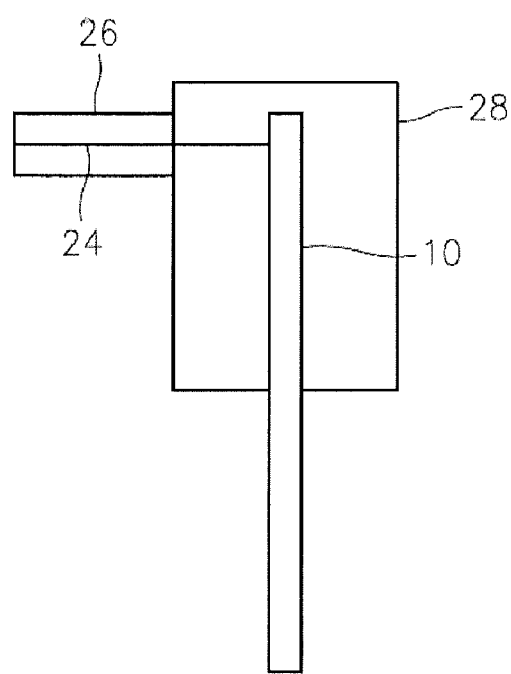
FIG. 2 is a cross-sectional plan view of an exemplary multi-core fiber actuated by a push rod and bellows.

Referring now to FIG. 2, a cross-sectional plan view of an exemplary multi-core fiber 10 is illustrated in a system designed to actuate the fiber by a push rod 24 and bellows 26. The push rod 24 extends from the bellows normally against the multi-core fiber, which is provided in a media isolated housing 28. The bellows 26 is responsive to a pressure change to cause the push rod 24 to bend the fiber 10.

Referring back to FIG. 1, it is noted that the push rod 24 and bellows 26 is an exemplary mechanism to provide the pressure-induced force on the fiber illustrated by arrow 30. Such force 30 bends the fiber 10, placing exemplary grating 16 in tension and exemplary grating 18 in compression. Differential measurements in core 12 and 14 may then be taken to sense the pressure change. It is noted that not only are drift factors eliminated due to the collocated nature of the core measurement portions (e.g., gratings written during fiberization in multiple cores of a multi-core fiber), but temperature effects are also eliminated due to the nature of the multi-core system.

Figure 3:
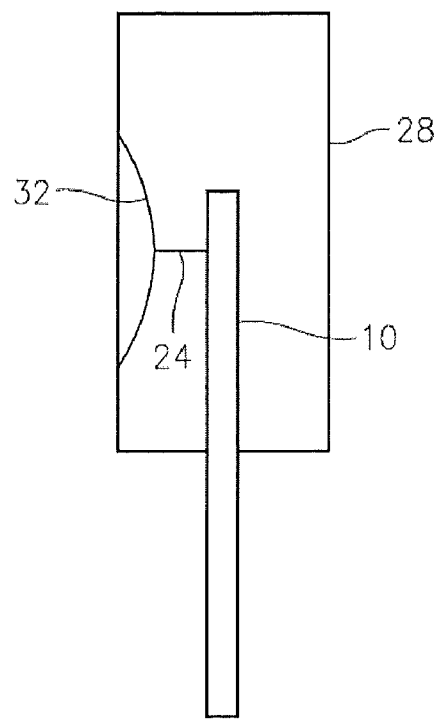
FIG. 3 is a cross-sectional plan view of an exemplary multi-core fiber actuated by a push rod and diaphragm.

Referring now to FIG. 3, a cross-sectional plan view of an exemplary multi-core fiber 10 is illustrated as being actuated by a push rod 24 and diaphragm 32. Other than use of the diaphragm 32 instead of the bellows 26, operation of the collocated sensor system is identical to that described above with regard to FIG. 2. It should be noted that any mechanism effective to transmit a force representative of pressure against the fiber is contemplated herein, the bellows and push rod and diaphragm and push rod embodiments being merely exemplary.

Figure 4:
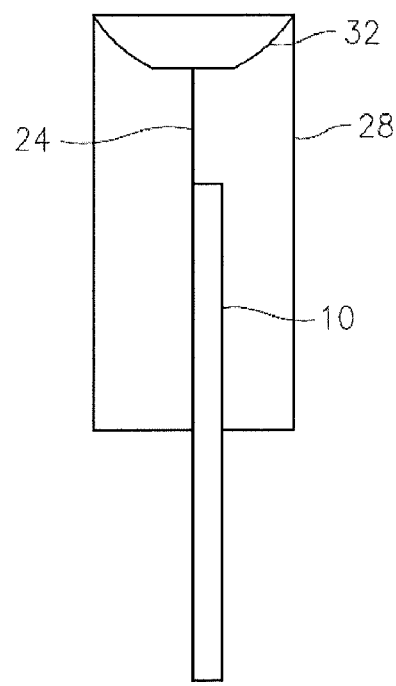
FIG. 4 is a cross-sectional plan view of an exemplary multi-core fiber asymmetrically actuated by a push rod and diaphragm.

Referring now to FIG. 4, a cross-sectional plan view of an exemplary multi-core fiber 10 is illustrated as being asymmetrically actuated by a push rod 24 and diaphragm. It should be recognized that any kind of actuation on the fiber might be performed, as long as the core measurement portions (20 in FIG. 1) of cores 12 and 14 are differentially affected by a force representative of a pressure change.

Referring now to FIG. 5, a cross-sectional plan view of an exemplary multi-core fiber 34 is illustrated as being actuated by well pressure, illustrated generally at 36 as acting on the multi-core fiber 34 within the media isolated housing 28. Referring now to FIG. 6, in this exemplary embodiment, the multi-core fiber 34 includes light guiding cores 12 and 14, as well as a low modulus core 38 and a high modulus core 40. As the well pressure 36 acts on the fiber 34, the low modulus core 38 and the high modulus core 40 react differently, causing the fiber 34 to bend. This bend accordingly affects the light guiding cores 12 and 14 differently (note that cores 12 and 14 should be arranged within the fiber such that they bend differently relative to the effects of the low and high modulus core reactions to pressure), and pressure may be calculated independent of temperature effects and drift factors. Also, while provision of low modulus and high modulus cores have been described with regard to this exemplary embodiment, any fiber construction that causes the fiber to deform under pressure is contemplated, including for example, a single core (provided at least partially along the core measurement portion) having a different modulus than the light guiding cores and having a different spacing with regard to cores 12 and 14. Also, the terms "low modulus" and "high modulus" are merely indicative of a difference in the modulus of the two cores, and are not meant to necessarily imply a great difference in modulus properties between the two cores 38 and 40.

Referring now to FIG. 7, a cross-sectional plan view of an exemplary multi-core fiber 42 is illustrated as being actuated by well and reference pressures, illustrated generally at 36 and 44, respectively. A media isolated housing 46 is provided over the fiber 42 and includes a pressure seal 48, separating the well and reference pressure zones. Referring now to FIG. 8, the fiber 34 includes light guiding cores 12 and 14, which are differentially spaced relative to a hollow core 50. Hollow core 50 extends from the well pressure zone 36 to the reference pressure zone 38, and causes deformation of the fiber 34 due to the difference in pressure between the reference pressure zone and the well pressure zone. Due to the differential spacing of the cores 12 and 14 relative to the hollow core 50, the bending will affect the light guiding cores 12 and 14 differently, and the change in pressure in the well pressure zone 36 can be measured.

Figure 9:
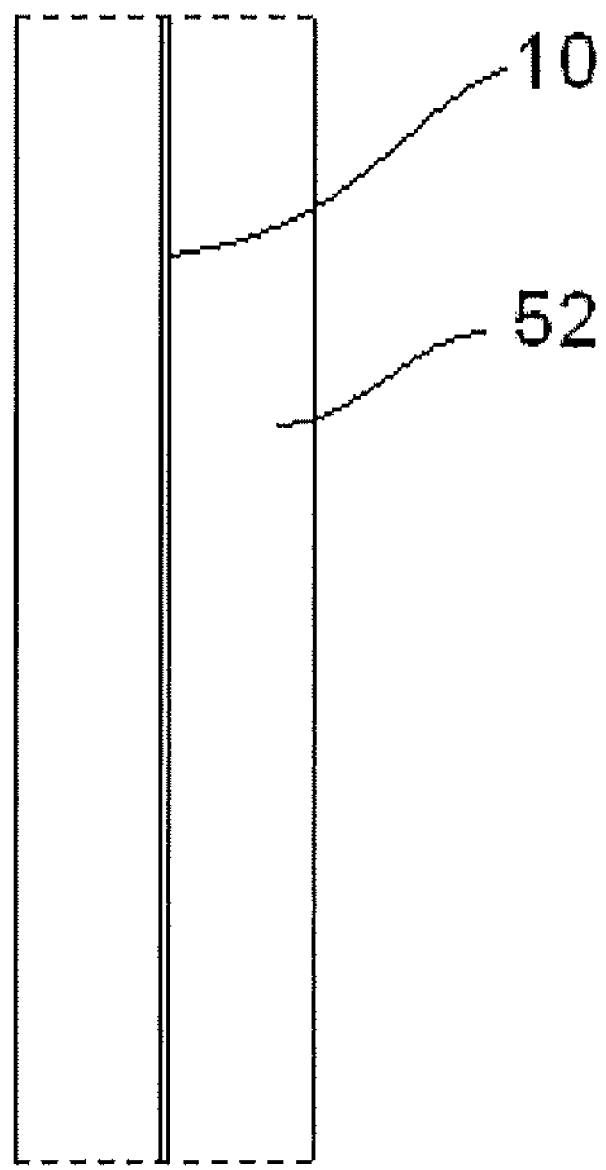
FIG. 9 is a plan view of an exemplary arrangement of an exemplary multi-core fiber with a device of interest.

Referring now to FIG. 9, an exemplary multi-core fiber 10 is arranged on a surface 52 or in a device of interest such that change in shape of the surface 52 or device will act on the multi-core fiber 10 affecting the collocated measurement portions in a different manner. More specifically, the fiber 10 may be arranged such that a change in shape of the surface 52 differentially affects the collocated measurement portions 16 and 18 (for example, placing measurement portion 16 in tension and placing measurement portion 18 in compression).

In other exemplary embodiments, optical domain reflectometry is utilized with the multi-core fiber to provide distributed measurements, for example for shape sensing, at various points of interest, as is described in U.S. patent application Ser. No. 11/180,389, filed Jul. 13, 2005, the entire contents of which are specifically incorporated herein by reference.

Figure 10:
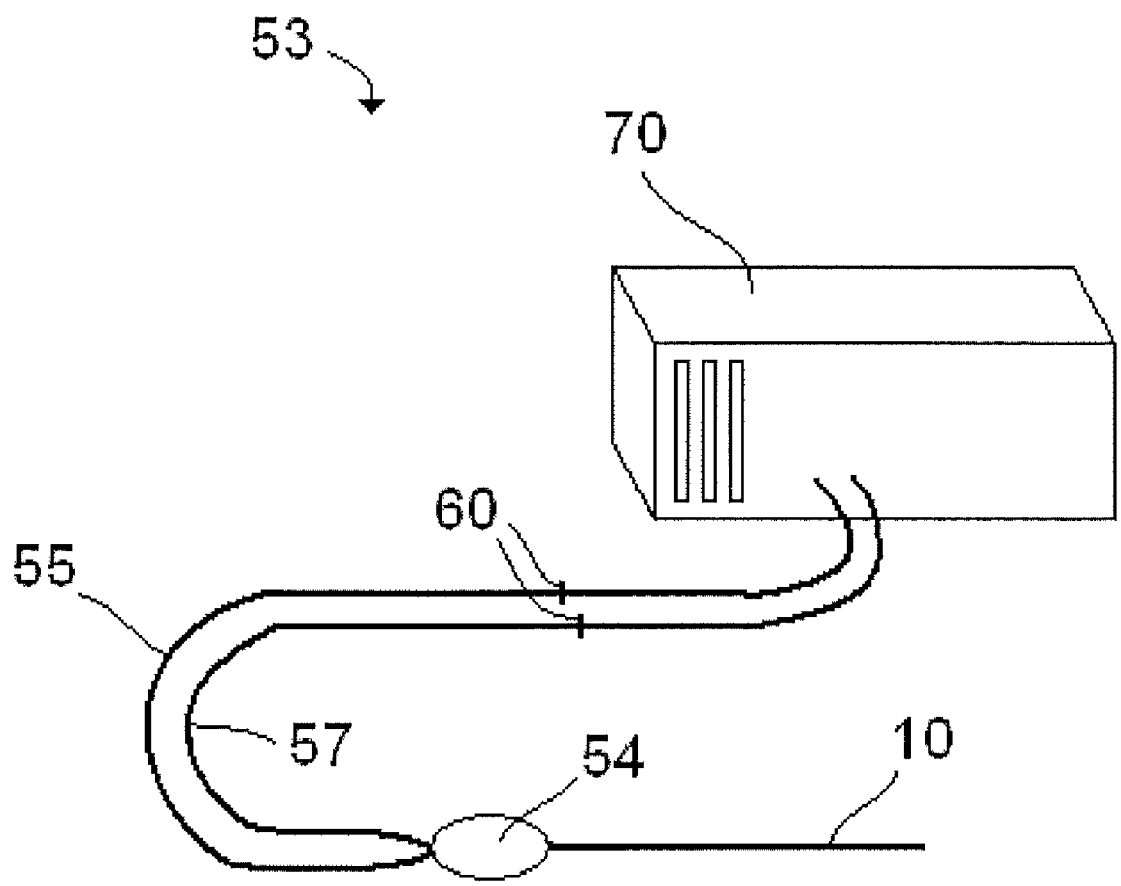
FIG. 10 is a perspective view of an exemplary device incorporating an exemplary multi-core fiber for providing distributed measurements.

Referring to FIG. 10, in an exemplary embodiment, a shape sensing device 53 incorporates the fiber 10 to provide distributed measurements for shape sensing. The fiber 10 is coupled to single core optical fibers 55 and 57 through a coupling device 54. In an exemplary embodiment, each single core optical fiber 55, 57 has a broadband reference reflector 60 positioned in an operable relationship to the collocated measurement portions wherein optical path lengths are established for the collocated measurement portions. In an exemplary embodiment, a frequency domain reflectometer 70 is positioned in an operable relationship to the fiber 10, for example, through the single core optical fibers 55, 57 such that the frequency domain reflectometer 70 is capable of receiving signals from the fiber Bragg gratings. Any frequency domain reflectometer known to those of ordinary skill in the art may be employed for the present invention provided that it is capable of monitoring many Bragg gratings at one time. Preferably, the frequency domain reflectometer receives signals from the fiber Bragg gratings. Such a device is known as the Luna Distributed Sensing System and is commercially available from Luna Innovations Incorporated.

In another exemplary embodiment, such multi-core optical fiber is attached to the point of interest, e.g., a drill string or casing, in order to monitor absolute shape and shape change. Such arrangement may likewise use optical frequency domain reflectometry and, e.g., either Bragg grating or Rayleigh scatter based, sensors to monitor fiber shape. When used on a wellbore, it may be used to infer wellbore shape over the whole well bore or over isolated regions with measurements that are insensitive to temperature and other drift mechanisms (as with the sensor arrangements described above). Such arrangement would also be less sensitive to strains due to the cabling process, since all cores would be affected in a similar manner as well. The use of such multi-core fiber also eliminates the need to interpret casing strains, and therefore is less prone to errors in measurements and casing mechanical models. This also eliminates the need to understand the attachment to the casing with respect to strain transfer.

Figure 11:
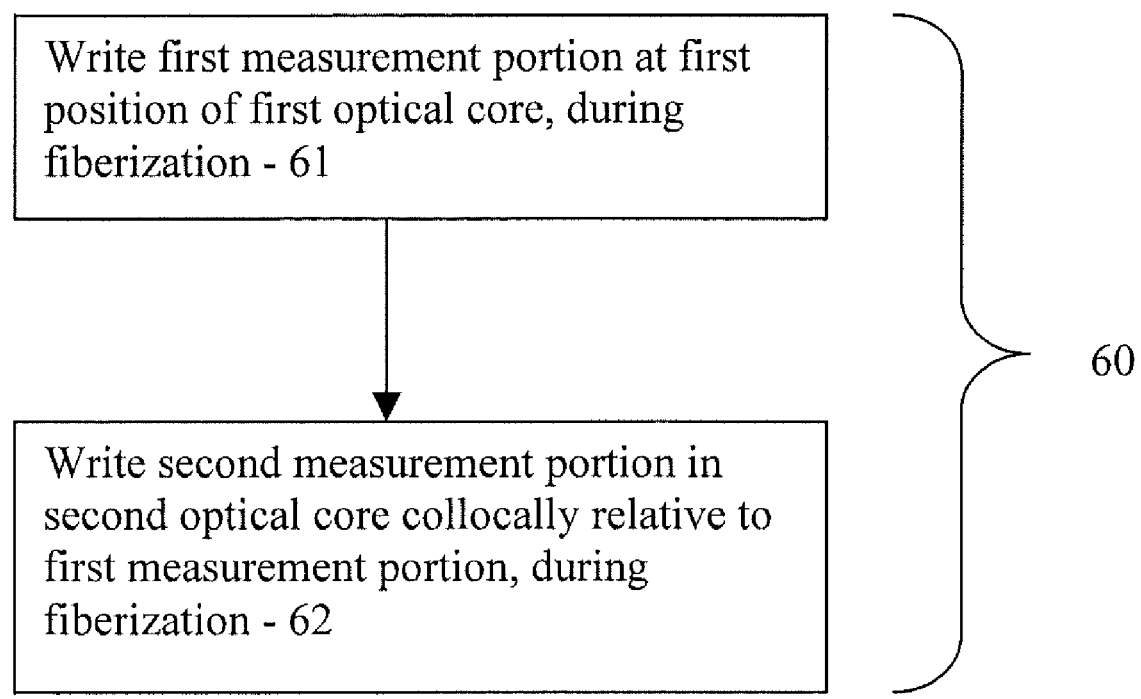
FIG. 11 is a flowchart illustrating an exemplary method of fabricating a fiber optic sensor.

Referring now to FIG. 11, an exemplary method 60 of fabricating a fiber optic sensor is provided. The method includes stages 61 and 62. The method 60 may be performed in conjunction with, for example, fibers 10, 34 and/or 42.

In the first stage 61, a first measurement portion is written in a first optical core of an optical fiber at a first position along the length of the first optical core. In the second stage 62, a second measurement portion is written in a second optical core of the optical fiber collocally relative to the first measurement portion. The first and second measurement portions are written during fiberization of the fiber optic sensor.

In an exemplary embodiment, the first and second measurement portions are written during drawing of the optical fiber. In another exemplary embodiment, the first and second measurement portions are written prior to application of a protective portion around the first and second optical cores.

It will be apparent to those skilled in the art that, while exemplary embodiments have been shown and described, various modifications and variations can be made to the embodiments disclosed herein without departing from the spirit or scope of the invention. Accordingly, it is to be understood that the various embodiments have been described by way of illustration and not limitation.

The invention claimed is:

1. A fiber optic sensor for generating a temperature and drift corrected environmental parameter measurement, comprising:
   an optical fiber having a plurality of light guiding cores, at least two of the plurality of light guiding cores positioned within said optical fiber such that the light guiding cores are differentially affected by a bending of the optical fiber to measure the parameter;
   collocated optical measurement portions in at least two of the plurality of light guiding cores; and
   a mechanism configured to apply a force on the optical fiber in response to an environmental parameter incident on the fiber optic sensor;
   wherein one collocated measurement portion in at least one of the at least two light guiding cores experiences compression and another collocated measurement portion in at least one other of the at least two light guiding cores experiences tension resulting from the bending to provide a differential measurement between the collocated optical measurement portions that is used for the temperature and drift corrected measurement.

2. A sensor in accordance with claim 1, wherein said optical fiber is positioned on a device surface or within a device.

3. A sensor in accordance with claim 1, wherein said optical fiber is configured to bend in response to a change in environmental pressure.

4. A sensor in accordance with claim 2, wherein said optical fiber is configured to bend in response to a change in shape of the device or the device surface.

5. A sensor in accordance with claim 4, wherein said optical fiber is configured to measure position and shape of the device or the device surface with a frequency domain reflectometer positioned in an operable relationship to the optical fiber cores.

6. A sensor in accordance with claim 5, wherein said optical fiber is attached to the drill string or casing of a wellbore and is configured to monitor absolute shape and shape change.

7. A sensor in accordance with claim 6, wherein the collocated optical measurement portions comprise collocated Bragg gratings.

8. A sensor in accordance with claim 6, wherein said collocated optical measurement portions comprise in-fiber interferometers or random photo-etched structures.

9. A sensor in accordance with claim 1, wherein the environmental parameter is an environmental pressure incident on the fiber optic sensor.

10. An apparatus configured to perform a temperature and drift corrected measurement of a parameter, the apparatus comprising:
    an optical fiber configured to measure the parameter by bending, the optical fiber comprising a first light guiding core and a second light guiding core, each light guiding core comprising a collocated optical measurement portion and being configured to be interrogated by light to sense the bending;
    wherein the collocated measurement portion in the first light guiding core experiences compression and the collocated measurement portion in the second light guiding core experiences tension in response to the bending of the optical fiber to provide a differential measurement between the collocated optical measurement portions that is used for the temperature and drift corrected measurement.

* * * * *